United States Patent
Kang

(10) Patent No.: US 8,842,172 B2
(45) Date of Patent: *Sep. 23, 2014

(54) OPERATION METHOD OF SHUTTER GLASSES BASED 3D DISPLAY DEVICE

(75) Inventor: Chihtsung Kang, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 432 days.

This patent is subject to a terminal disclaimer.

(21) Appl. No.: 13/381,936

(22) PCT Filed: Nov. 26, 2011

(86) PCT No.: PCT/CN2011/083000
§ 371 (c)(1),
(2), (4) Date: Dec. 31, 2011

(87) PCT Pub. No.: WO2013/071640
PCT Pub. Date: May 23, 2013

(65) Prior Publication Data
US 2013/0120363 A1    May 16, 2013

(51) Int. Cl.
*H04N 13/04* (2006.01)
*H04N 9/47* (2006.01)

(52) U.S. Cl.
CPC .............................. *H04N 13/0438* (2013.01)
USPC .............................................. 348/56; 348/53

(58) Field of Classification Search
None
See application file for complete search history.

(56) References Cited

U.S. PATENT DOCUMENTS

2011/0050870 A1 *  3/2011  Hanari ............................ 348/56

FOREIGN PATENT DOCUMENTS

CN         102213834 A        10/2011

* cited by examiner

*Primary Examiner* — Heather Jones
(74) *Attorney, Agent, or Firm* — Cheng-Ju Chiang

(57) ABSTRACT

The present invention relates to an operation method of shutter glasses based 3D display device, which alternatively supplies left-eye and right-eye frame signals to a liquid crystal panel to drive the liquid crystal panel to respectively form left-eye and right-eye images, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal. The operation method of shutter glasses based 3D display device according to the present invention alleviates after image caused by crosstalk between left and right eyes, compensates the reduction of luminance caused by shortening the duty time of each block of the back light unit, and thus achieves the purpose of saving energy.

2 Claims, 2 Drawing Sheets

OPERATION METHOD OF SHUTTER GLASSES BASED 3D DISPLAY DEVICE

BACKGROUND OF THE INVENTION

1. Field of the Invention

The present invention relates to the technical field of 3D (3-Dimensional) displaying, and in particular to an operation method of shutter glasses based 3D display device.

2. The Related Arts

The conventional glasses based 3D displaying techniques generally supply signals of left-eye and right-eye frames to a liquid crystal panel in an alternate manner to respectively drive the liquid crystal panel to form thereon left-eye and right-eye images, which cooperate with illumination of a scanning back light unit (BLU) and timing control of shutter glasses to stimulate left and right eyes with left-eye and right-eye signals respectively to thereby making a user perceive a 3D image. Since the response speed of a liquid crystal screen is excessively slow, the timing of activation of the BLU and opening of the shutter glasses and the duty time thereof must be adjusted to reduce the influence of crosstalk between left and right eyes. However, such control of timing reduces the activation time of the backlight and the shutter glasses, resulting in reduction of luminance or flickering.

As shown in FIG. 1, a timing chart of a conventional shutter glasses based 3D display device is shown. The vertical axis indicates vertical positions on a panel of the display device and the horizontal axis indicates time. The BLU of a regular 3D display device is divided into vertical blocks and thus a scanning operation is performed to sequentially, in a top to down manner, control the activation and duty time of each block of the back light unit (an example of five blocks, S1, S2, S3, S4, S5, being given in FIG. 1). The time period for left-eye and right-eye signals of the display device are respectively T1 and T2, each representing the time period of a frame. A frame time is composed of the driving time of a signal (the signal being from the first line to the last line) and time of blanking. The signal sequentially provides a necessary driving voltage to each line of the liquid crystal panel in a top to down manner. After a pixel receives the driving voltage and is charged, the liquid crystal starts to respond. Due to the arrangement of pixel and the viscosity of liquid crystal, there is a period of response time, L0, for the liquid crystal to completely reach a desired stable condition, namely the target luminance signal for each of the left and right eyes. Further, an additional important parameter of the shutter glasses based 3D display device is the opening and closing time of the left and right eyes of the shutter glasses. An overall adjustment must be made on the timing of the shutter glasses, in combination with the scanning time of each block of the back light unit, the response time of the liquid crystal, and the blanking time, to realize optimization of the 3D effect of the liquid crystal display, so that the left-eye and right-eye signals will not overlap and cause after image. Otherwise, as shown in FIG. 1, during the opening time period of the left eye of the shutter glasses, the signal to the liquid crystal associated with block S1 has already been switched from a left-eye signal to a right-eye signal, and this causes the right-eye signal to be seen during the opening time period of the left eye of the shutter glasses. Consequently, at the time when block S1 is in operation, the left eye of the shutter glasses will see the after image of the right-eye signal in a short period of time. Further, as shown in FIG. 1, the left eye of the shutter glasses has an early opening time and blocks S2, S3, S4, and S5, when in operation, supply left-eye signals. Meanwhile, due to the slow response of liquid crystal, blocks S2, S3, S4, and S5, when in operation, are subject to influence, to different extents, by the previous right-eye image, resulting in interference of after image.

SUMMARY OF THE INVENTION

Thus, an objective of the present invention is to provide an operation method of shutter glasses based 3D display device that alleviates the after image phenomenon of the shutter glasses based 3D display device.

To achieve the objective, the present invention provides an operation method of shutter glasses based 3D display device, which alternatively supplies left-eye and right-eye frame signals to a liquid crystal panel to drive the liquid crystal panel to respectively form left-eye and right-eye images, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal.

Wherein, each of the blocks of the back light unit has identical duty time.

Wherein, each of pixels located in the liquid crystal corresponding to each of the blocks of the back light unit, transmittance of the pixel is individually changed to $T_{m,pixel} = T_{m,pixel,0} \times T_{Max}/T_M$, where Max indicates maximum signal grey level of the liquid crystal panel, $T_{Max}$ indicates liquid crystal transmittance corresponding to the maximum signal grey level Max, m indicates the liquid crystal corresponding to a mth block of the back light unit in which the pixel is located, M indicates the original maximum signal grey level of the current frame for the liquid crystal corresponding to the mth block of the back light unit, $T_M$ indicates liquid crystal transmittance corresponding to the signal grey level M, and $T_{m,pixel,0}$ indicates original transmittance of the pixel located in the liquid crystal corresponding to the mth block of the back light unit for the current frame.

Wherein, on the basis that the transmittance of each of the pixels is individually changed, the following formula is used to calculate compensation value for a driving current of each of the blocks of the back light unit:

target luminance of liquid crystal corresponding to the block=$T_{Max}$×the duty time of backlight of the block× backlight luminance of compensated driving current of the block, wherein the target luminance of liquid crystal corresponding to each of the blocks is the maximum 2D luminance of the liquid crystal corresponding to the block or the maximum 3D luminance of the liquid crystal corresponding to the block.

The operation method of shutter glasses based 3D display device according to the present invention alleviates after image caused by crosstalk between left and right eyes, compensates the reduction of luminance caused by shortening the duty time of each block of the back light unit, and thus achieves the purpose of saving energy.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
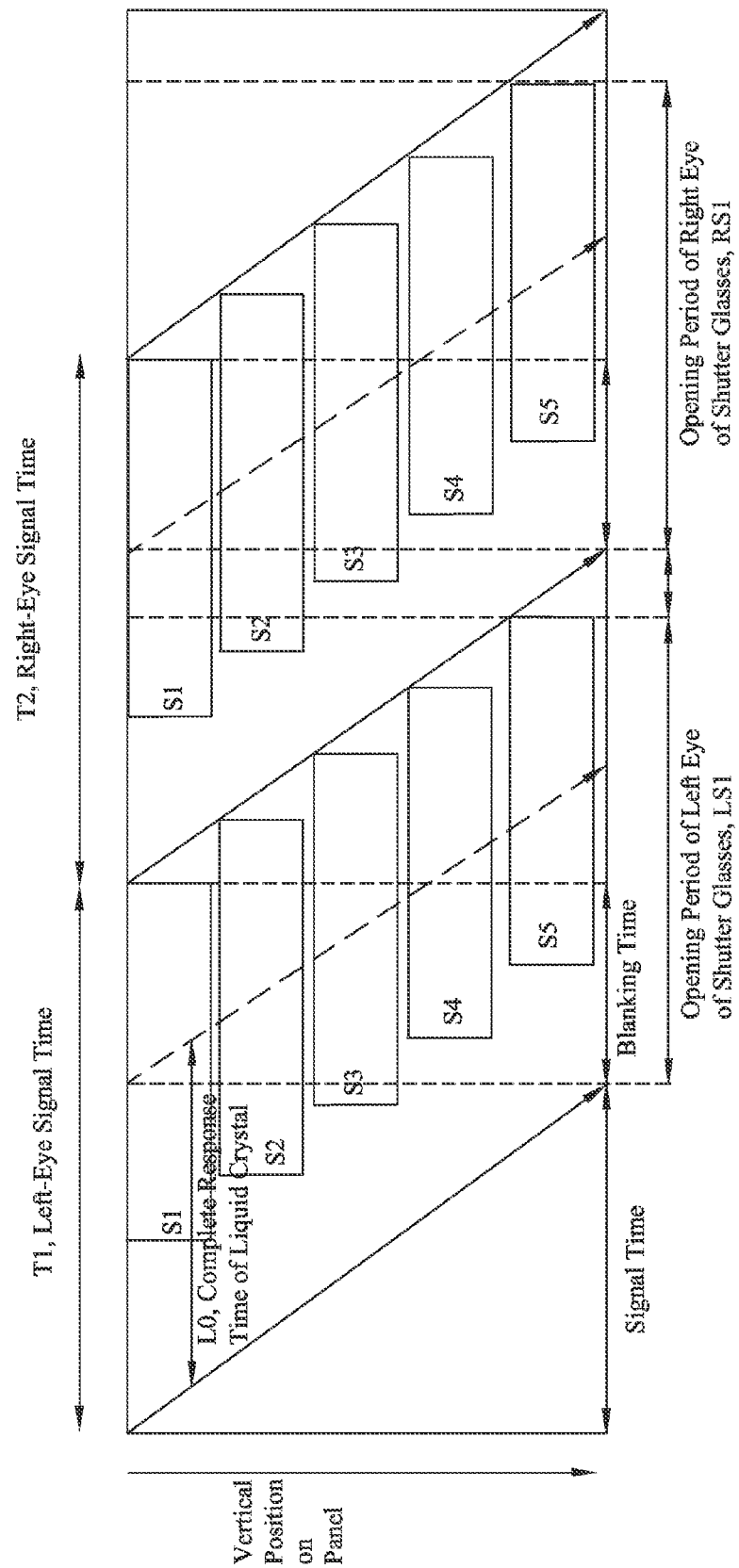
FIG. 1 is a timing chart of a conventional shutter glasses based 3D display device.
Figure 2:
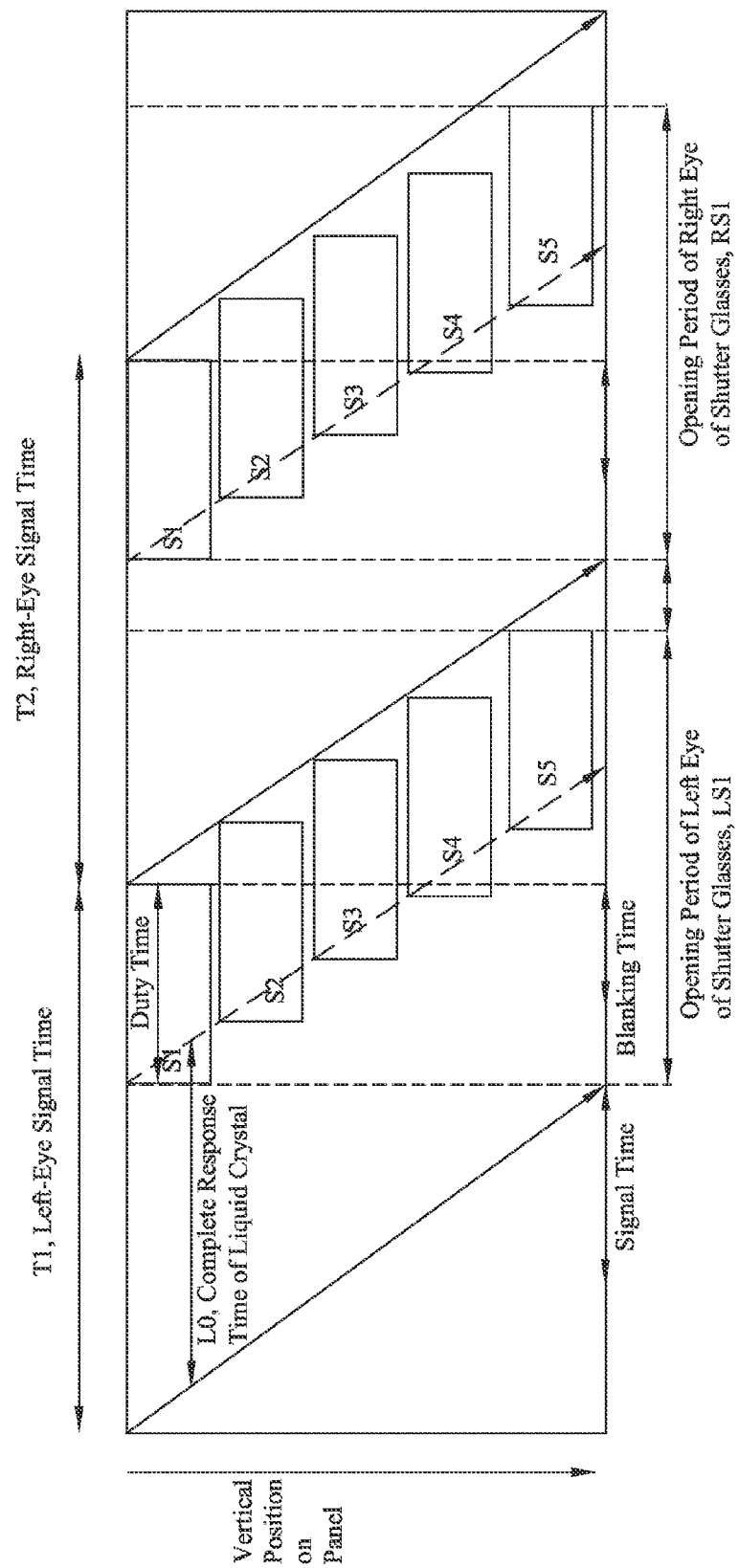
FIG. 2 is a timing chart of an operation method of shutter glasses based 3D display device according to the present invention according to a preferred embodiment of the present invention.

Referring to FIG. 2, a timing chart of an operation method of shutter glasses based 3D display device according to a preferred embodiment of the present invention is shown.

The operation method of shutter glasses based 3D display device according to the present invention adopts an essential process that is identical to that of a conventional shutter glasses based 3D display device by alternately supplying left-eye and right-eye frame signals to a liquid crystal panel to drive the liquid crystal panel to separately form left-eye and right-eye images, so as to cooperate with illumination of a scanning back light unit and timing control of the shutter glasses to simulate left and right eyes respectively with left-eye and right-eye signals for perception of a 3D image.

As shown in FIG. 2, in the period of a current frame signal (T1 left-eye signal time or T2 right-eye signal time), the duty time of each of blocks of the back light unit (each of blocks S1, S2, S3, S4, S5) is located between the time when the liquid crystal corresponding to the block completely responds after being driven by the current frame signal and the time when the liquid crystal corresponding to the block starts to respond as being driven by a subsequent frame signal. In other words, the activation time of the LED of each block of the back light unit is controlled to activate after the liquid crystal responds and the duty time of each block is after the liquid crystal has completely responded and before the liquid crystal corresponding to the block is charged by the next frame signal (left eye switched to right eye signal). In a preferred embodiment, the duty time of each block of the back light unit is set to be equal. To alleviate after image caused by crosstalk between left and right eyes, the present invention shortens the duty time of the LED of each block of the BLU (Back Light Unit).

Also, since the activation time of each block of the back light unit is shortened, the overall luminance lowers. Thus, the luminance of the image signal on the liquid crystal panel must be increased.

Therefore, the present invention adopts the following solution. For each pixel located in the liquid crystal corresponding to each of the blocks of the back light unit, the transmittance of each pixel is individually changed to $T_{m,pixel} = T_{m,pixel,0} \times T_{Max}/T_M$, where Max indicates the maximum signal grey level of the liquid crystal panel, $T_{Max}$ indicates liquid crystal transmittance corresponding to the maximum signal grey level Max, m indicates the liquid crystal corresponding to the mth block of the back light unit in which the pixel is located, M indicates the original maximum signal grey level of the current frame for the liquid crystal corresponding to a mth block of the back light unit, $T_M$ indicates the liquid crystal transmittance corresponding to the signal grey level M, and $T_{m,pixel,0}$ indicates the original transmittance of the pixel located in the liquid crystal corresponding to the mth block of the back light unit for the current frame.

Specifically, for example, taking an 8-bit color level liquid crystal panel as an example, the maximum grey level is 255. Assuming the maximum signal grey level of the liquid crystal corresponding to block S1 is N, and the maximum original signal grey level of the liquid crystal corresponding to block S2 is M, then besides the transmittance of the pixel of the liquid crystal corresponding to block S1 that has the maximum signal grey level N being set to $T_{255}$, the transmittance of the remaining pixels in this block is magnified by a ratio of $T_{255}/T_N$. Similarly, in block S2, except the pixel having the maximum signal grey level M of which the transmittance is magnified to $T_{255}$, the transmittance of the remaining pixels in this block is magnified by a ratio $T_{255}/T_M$. By magnifying the transmittance of liquid crystal, the luminance of the liquid crystal panel can be correspondingly increased.

Assuming $T_{255} > T_M > T_N$, then with the maximum signal grey level for the liquid crystal corresponding to block 51 being changed to 255, the transmittance of liquid crystal is magnified by $T_{255}/T_N$, and with the maximum signal grey level of the liquid crystal corresponding to block S2 being changed to 255, the transmittance is magnified by $T_{255}/T_M$, and $T_{255}/T_M < T_{255}/T_N$, whereby changing liquid crystal grey level leads to the signal magnification of block S2 smaller than that of S1. Thus, in order to maintain relative consistency of the maximum luminance of the liquid crystal panel, the luminance of the corresponding block of the back light unit must be increased and correspondingly, the magnification $T_M/T_{255}$ for LED current in block S2 must be greater than the magnification $T_N/T_{255}$ for LED current in block S1. On the basis that the transmittance of each pixel is individually changed, the following formula allows calculation of compensation value for driving current of each block of the back light unit:

Target luminance of liquid crystal corresponding to each block=$T_{Max} \times$the duty time of backlight of the block×backlight luminance of compensated driving current of the block, wherein the target luminance of liquid crystal corresponding to each block is the maximum 2D luminance of the liquid crystal corresponding to the block or the maximum 3D luminance of the liquid crystal corresponding to the block. Specifically, according to FIG. 2, the maximum 2D luminance of the liquid crystal corresponding to each block (S1, S2, S3, S4, S5)=the maximum 3D luminance of the liquid crystal corresponding to each block (S1, S2, S3, S4, S5)=the maximum transmittance (which is the transmittance for grey level 255 for an example of 8-bit liquid crystal)×the duty time of each backlight block×backlight luminance of compensated driving current of the block. By adjusting the LED current of each block, the luminance of the liquid crystal panel can be maintained at the 2D luminance level. The reduction of luminance caused by the present invention shortening the duty time of the LED activation of each block can be compensated by calculating the magnification of the maximum signal of each block to realize compensation of the magnification signal of LED current of each block, to thereby achieve the purposes of saving energy.

The present invention allows the shutter glasses based 3D display device to show the minimum after image by controlling LED current power, duty time and signal of each block (S1, S2, S3, S4, S5), in combination with compensation. An advantage of this operation is that due to the duty time of each block being identical, the current maximum signal of each block is magnified from the maximum grey level signal n and the transmittance $T_n$ that original to the block to the grey level signal 255 and the transmittance $T_{255}$, the transmittance being magnified by the ratio $T_{255}/T_n$, so that correspondingly, the magnification of the driving current for each block caused by the duty time of each block beings shortened and crosstalk phenomenon being reduced can be different, thereby achieving the purpose of saving energy.

In summary, the operation method of shutter glasses based 3D display device according to the present invention alleviates the after image phenomenon due to crosstalk between left and right eyes, compensates the reduction of luminance due to shortening the duty time of each block of the back light unit, and thus achieves the purposes of saving power.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An operation method of shutter glasses based 3D (3-Dimensional) display devices, which alternatively supplies left-eye and right-eye frame signals to a liquid crystal panel to drive the liquid crystal panel to respectively form left-eye and right-eye images, which cooperate with illumination of a scanning back light unit and timing control of the shutter glasses to simulate left and right eyes respectively with left-eye and right-eye signals for perception of a 3D image, wherein in a period of a current frame signal, duty time of each of blocks of the back light unit is located between the time when liquid crystal corresponding to the block completely responds after being driven by the current frame signal and the time when the liquid crystal corresponding to the block starts to respond as being driven by a subsequent frame signal;

wherein each of the blocks of the back light unit has identical duty time; and wherein for each of pixels located in the liquid crystal corresponding to each of the blocks of the back light unit, transmittance of the pixel is individually changed to $T_{m,pixel} = T_{m,pixel,0} \times T_{Max}/T_M$, where Max indicates maximum signal grey level of the liquid crystal panel, $T_{Max}$ indicates liquid crystal transmittance corresponding to the maximum signal grey level Max, m indicates the liquid crystal corresponding to a mth block of the back light unit in which the pixel is located, M indicates the original maximum signal grey level of the current frame for the liquid crystal corresponding to the mth block of the back light unit, $T_M$ indicates liquid crystal transmittance corresponding to the signal grey level M, and $T_{m,pixel,0}$ indicates original transmittance of the pixel located in the liquid crystal corresponding to the mth block of the back light unit for the current frame.

2. The operation method of shutter glasses based 3D display devices as claimed in claim 1, wherein, on the basis that the transmittance of each of the pixels is individually changed, the following formula is used to calculate compensation value for a driving current of each of the blocks of the back light unit: target luminance of liquid crystal corresponding to the block=$T_{Max}\times$the duty time of backlight of the block×backlight luminance of compensated driving current of the block; wherein the target luminance of liquid crystal corresponding to each of the blocks is the maximum 2D luminance of the liquid crystal corresponding to the block or the maximum 3D luminance of the liquid crystal corresponding to the block.

* * * * *